United States Patent [19]

St. Pierre

[11] Patent Number: 4,752,770
[45] Date of Patent: Jun. 21, 1988

[54] APPARATUS FOR MONITORING TEMPERATURES OF IMPLEMENTS DURING BRAZING

[75] Inventor: Philippe D. St. Pierre, Worthington, Ohio

[73] Assignee: General Electric Company, Worthington, Ohio

[21] Appl. No.: 23,205

[22] Filed: Mar. 9, 1987

Related U.S. Application Data

[63] Continuation-in-part of Ser. No. 838,110, Mar. 10, 1986, abandoned.

[51] Int. Cl.⁴ .................... G01N 25/18; G08B 23/00
[52] U.S. Cl. .................................... 340/596; 374/179; 307/310
[58] Field of Search ............. 374/179, 170; 324/65 P; 340/584, 596

[56] References Cited

U.S. PATENT DOCUMENTS

| | | | |
|---|---|---|---|
| 2,870,233 | 1/1959 | Comer | 374/179 X |
| 4,118,986 | 10/1978 | Werner et al. | 374/179 X |
| 4,148,086 | 4/1979 | Landa et al. | 340/588 X |
| 4,255,962 | 3/1981 | Ashman | 374/10 |
| 4,406,550 | 9/1983 | Gray | 374/170 X |
| 4,466,749 | 8/1984 | Cunningham et al. | 374/179 X |
| 4,505,600 | 3/1985 | Suzuki et al. | 374/170 |
| 4,527,998 | 7/1985 | Knemeyer | 51/309 |
| 4,603,980 | 8/1986 | Berg | 324/65 P X |

OTHER PUBLICATIONS

"Thermocouple Input Dial Limit Alarms", Action Instruments Inc., Aug. 1985, Product Brochure-AP12-20-AP1224.

Primary Examiner—Daniel M. Yasich
Attorney, Agent, or Firm—Mueller and Smith

[57] ABSTRACT

Disclosed is an apparatus for monitoring the temperature of an implement being brazed to a workpiece. The preferred implement is a polycrystalline diamond composite compact which is brazed to a drill bit or other workpieces. The apparatus comprises an insulated a temperature probe comprising a stiff support rod of predetermined length with a first passageway therethrough. An insulating handle is connected in supporting relationship with the rod and has a second passageway therethrough which communicates with the first passageway. A heat shield is disposed about the handle in the vicinity of its connection with the base portion of the rod. A thermocouple means for generating signals correlative with temperature is disposed at the rod tip and energized from leads extending to an alarm unit. The alarm unit includes a power supply and a circuit which carries out a comparator function for energizing an annunciator when proper braze temperatures commence and further energizing the annunciator function to signal excessive temperature at the braze. A method provides using the apparatus disclosed herein.

21 Claims, 4 Drawing Sheets

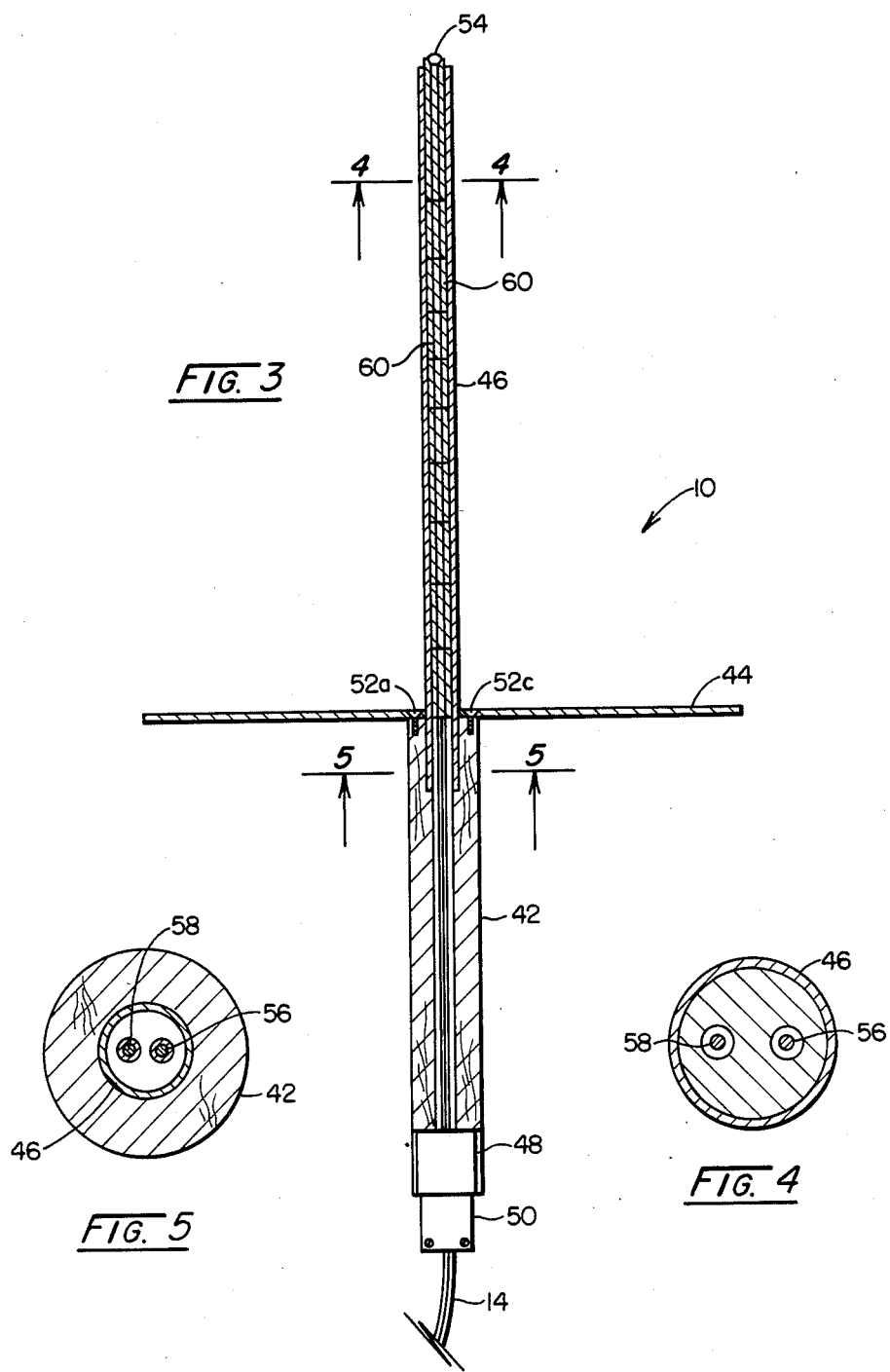

APPARATUS FOR MONITORING TEMPERATURES OF IMPLEMENTS DURING BRAZING

CROSS-REFERENCE TO RELATED APPLICATION

This application is a continuation-in-part of U.S. application Ser. No. 06/838,110, filed Mar. 10, 1986, entitled "Apparatus for Monitoring Temperatures of Implements During Brazing" by St. Pierre, and assigned in common herewith, now abandoned.

TECHNICAL FIELD

This invention relates to implements incorporating abrasive particle compacts and more particularly to an apparatus useful in monitoring the temperature of the compacts during brazing of the implements to workpieces. The abrasive particle compact implements have special utility in drill bits for oil and gas exploration and in mining applications.

BACKGROUND ART

An abrasive particle compact is a polycrystalline mass of abrasive particles such as diamond and/or cubic boron nitride bonded together to form an integral, tough, high-strength mass. Such components can be bonded together in a particle-to-particle self-bonded relationship, by means of a bonding medium disposed between the particles, or by combinations thereof. For examples, see U.S. Pat. Nos. 3,136,615; 3,141,746; and 3,233,988. A supported abrasive particle compact herein termed a composite compact, is an abrasive particle compact which is bonded to a substrate material, such as cemented tungsten carbide. Compacts of this type are described, for example, in U.S. Pat. Nos. 3,743,489, 3,745,623, and 3,767,371. The bond to the support can be formed either during or subsequent to the formation of the abrasive particle compact.

Composite compacts have found special utility as cutting elements in drill bits. These compacts can be attached directly to the drill crown of drill bits by a variety of techniques. U.S. Pat. No. 4,156,329 proposes to furnace braze a pre-tinned metal-coated compact to recesses formed in the crown. U.S. Pat. No. 4,186,628 proposes to attach the compact cutters to the crown by placing the compacts in a mold, filling the crown portion of the mold with powder, and running a low temperature infiltration braze into the mold to form the crown containing the compacts embedded therein. U.S. Pat. No. 4,098,362 proposes drill bits in the manner of the latter proposal wherein the cutters are placed at a rake angle of between $-10°$ and $-25°$.

Alternatively, composite compacts can be affixed to an elongated stud or substrate which stud then is attached to the drill crown. The stud provides greater attachment area to the drill crown. It also provides more support for the abrasive particle compact thereby increasing its impact resistance. Composite compacts have been attached to studs in both a right cylinder configuration as depicted in U.S. Pat. No. 4,200,159, and in an angled configuration, as shown, for example, in U.S. Pat. No. 4,265,324.

Although the benefits of attaching a composite compact to a stud or substrate are apparent, problems have been encountered in achieving the actual attachment. In particular, it has been noted that composite compacts in which the abrasive portion is self-bonded and metal infiltrated such as described in U.S. Pat. No. 3,745,623 and available commercially under the trademarks Compax and Syndite are susceptible to thermal damage if exposed to temperatures in excess of about 700° C. (As used herein self-bonded means that the abrasive particles are directly bonded one to another). This damage is thought to result from a differential in the thermal expansion rate of the abrasive and metal phases. At elevated temperatures there is also a risk of degradation to the particles themselves as by graphitization or oxidation. This type of degradation is thought to be of concern for all types of abrasive particle compacts. Accordingly, braze alloys with liquidus temperatures of less than 700° C. were utilized initially for attachment of composite compacts to studs or substrates. Unfortunately, such low temperature braze alloys found only limited applicability in the marketplace due to their characteristically low bond strengths.

A major breakthrough in the attachment of composite compacts to substrates was made by Knemeyer in U.S. Pat. Nos. 4,225,322 and 4,319,707. The Knemeyer process permits the use of high temperature braze alloys for attaching a composite compact to a substate. Such high temperature braze alloys, in turn, provide significantly greater bond strengths. While the Knemeyer method and apparatus permit the use of high temperature braze alloys, difficulty has arisen in the selection of a suitable one. For example, Anaconda 773 filler metal, initially proposed in the Knemeyer patents, is now thought to be undesirably reactive with the carbide pieces being joined. Preferred brazing alloys include the gold-based alloy disclosed in commonly-assigned U.S. Pat. No. 4,527,998 and the palladium-based braze alloy disclosed in commonly-assigned application Ser. No. 752,419, filed July 5, 1985.

Complicating the braze operation is the necessary exposure of the polycrystalline mass of the composite compact to the elevated temperatures necessary for accomplishing the braze operation. During such brazing or welding operations, is difficult at best for the brazer or a helper to take temperature measurements of the polycrystalline mass, even though such temperature measurements may be critical to the success of the brazing operation. Two factors contributing to this problem include the necessity for the brazer to wear dark goggles for protection against the bright light emitted by the flame and the object being heated, and the need of the brazer to devote an undivided attention to the workpiece during the brazing operation. It is easy to overheat the composite compact since the flame is much hotter than the temperature actually needed to melt and flow the braze filler material.

BROAD STATEMENT OF THE INVENTION

The present invention is directed to such brazing operation and particularly addresses the need for closely monitoring the actual temperature of the polycrystalline mass during the brazing or welding operation so that a minimum temperature is reached whereat the braze filler material flows and properly brazes the implement to the workpiece but does not exceed a threshold temperature whereat thermal damage to the polycrystalline mass mass might occur. The apparatus comprises a temperature probe comprising a stiff support rod of predetermined length with extent extending from a base portion to a tip. Thermal insulation means is disposed within the support rod substantially along the lengthwise extent and has a first passageway therethrough. An insulating handle is connected in supporting relationship with the rod and has a second passageway therethrough which communicates with the first passageway. A heat shield is disposed about the handle in the vicinity of its connection with the base portion of the rod. Thermocouple means is energizable for deriving sensing signals of given levels correlative with temperature is disposed at the rod tip and lead means within the first and second passageways electrically coiupled with thermocouple means. An alarm unit is provided including a power supply responsive to an a.c. source for deriving a d.c. supply output. An annunciator arrangement energizable by a first drive signal to provide a first audibly perceptible output is additionally energizable by a second drive signal to provide a second perceptible output. Circuit means are provided which are energizable from the d.c. supply output and which are coupled with the annunciator arrangement and with lead means for effecting the energization of the thermocouple means and responsive to the sensing signals derived thereby reaching a first predetermined level corresponding with a braze enablement temperature value to generate the first drive signal and further is responsive to the sensing signals reaching a second predetermined level corresponding with a braze temperature threshold excessive level to generate the second drive signal. Also disclosed is a method for monitoring the temperature of an implement comprising a composite compact having an abrasive particle layer bonded to a support being brazed to a substrate by a brazing filler metal disposed therebetween. Such method comprises using the apparatus disclosed herein.

Advantages of the present invention include a temperature probe which not only monitors the temperature of the implement (e.g. polycrystalline mass) being brazed to a workpiece, but also provides tactile force for retaining the implement in proper position with the workpiece for the brazing operation to be accomplished. Another advantage is an apparatus which provides cuing as to whether the unit is on, e.g. electricity being supplied to the unit, and as to whether a proper electrical connection with the probe is present. A further advantage comprises dual audible alarms which indicate that the minimum braze temperature has been reached by one audible emission while reserving a second and distinguishable audible emision indicative of the upper temperature limit being reached during the brazing operation. This minimizes possible thermal damage to the implement arising by virtue of the brazing operation. These and other advantages will be readily apparent to those skilled in the art based upon the disclosure contained herein.

BRIEF DESCRIPTION OF THE DRAWINGS

FIG. 3 is a cross-section of the probe of FIG. 1 taken along line 3—3;

FIG. 4 is a cross-section of the temperature probe of FIG. 3 taken along line 4—4;

FIG. 5 is a cross-section of the probe of FIG. 3 taken along line 5—5;

The drawings will be described in detail below.

DETAILED DESCRIPTION OF THE INVENTION

Figure 1:
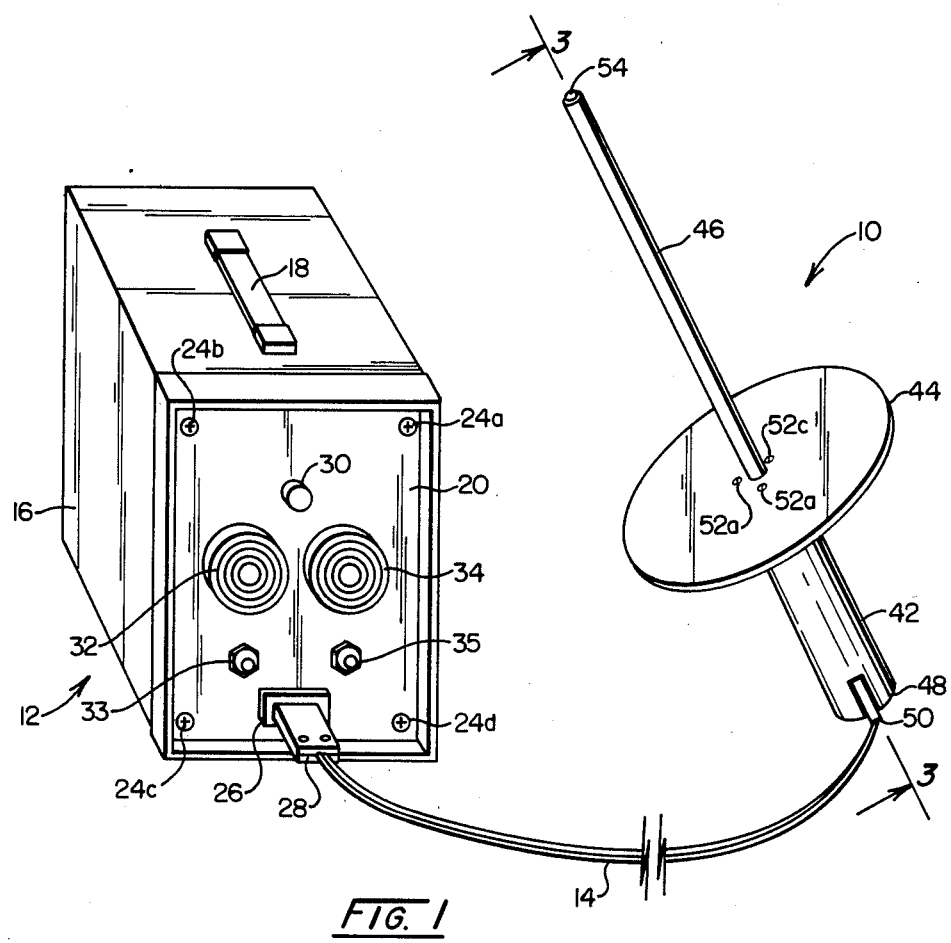
FIG. 1 is a perspective view of the temperature probe and alarm unit in their operating configuration.
Figure 2:
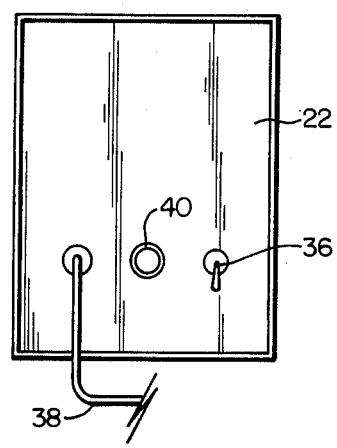
FIG. 2 is an elevational view of the rear side of the alarm unit of FIG. 1.

FIG. 1 shows the inventive apparatus for monitoring the temperature of an implement being brazed to a workpiece and which comprises temperature probe 10 and alarm unit 12 being electrically coupled through line 14. With reference to alarm unit 12, it will be observed that alarm unit 12 is comprised of container 16 which is shown to be rectangular, though other shapes of course may be provided. The top surface of container 16 bears handle 18 which is used because alarm unit 12 is portable. Alarm unit 12 further has a front or face plate 20 and rear plate 22 (FIG. 2). Face plate 20 is affixed to container 16 via screws 24a-24d. Face plate 20 further bears electrical connector 26 for receiving plug 28 which is disposed about the one end of line 14. Alarm unit 12 further contains light 30 disposed at face plate 20. Light 30 provides visual cuing that alarm unit 12 is energized (being supplied with electricity from a d.c. source) and functioning properly. It will be appreciated that audible cuing means can be provided in complement or in the alternative to light 30 as is necessary, desirable or convenient. Regardless of the mode of operation of such cuing means, an indicia correlative to proper functioning of the apparatus is provided to the brazer so that he can devote his full attention to the brazing operation.

Alarm unit 12 further contains alarms or annunciators 32 and 34 which provide audible alarm sounds responsive to temperatures being sensed by temperature probe 10. That is, circuit means in alarm unit 12 are preset with a first drive signal output corresponding with a thermocouple signal representing predetermined minimum temperature setting whereat proper brazing can proceed. Such temperature is determined based upon the particular braze filler metal being utilized. As soon as the signal from temperature probe 10 activates the first drive signal output, alarm or annunciator means 32 emits an audible sound, preferably a continuous sound, to let the brazer know that the brazing operation can proceed. Knobs 33 and 35 control the loudness of alarms 32 and 34, respectively. If temperature probe 10 becomes damaged or unplugged the circuit will cause alarm 34 to sound in addition to thus providing audible cuing means to the brazer that the apparatus is not in proper condition for being utilized.

The circuit means in alarm unit 12 additionally is preset to provide a second drive signal output corresponding with a thermocouple signal representing a second, predetermined, higher temperature setting which, when indicated by temperature probe 10, causes alarm or annunciated 34 to emit a second, e.g. intermittent, sound to let the brazer know that the upper threshold temperature limit or threshold is being approached, i.e. a temperature threshold excessive level. For example, this upper temperature limit may be set at the temperature whereat thermal damage to polycrystalline diamond can occur. The brazer now can focus full and undivided attention to the brazing operation without being concerned about monitoring meters or other temperature measuring devices which are occasionally used today. It will be appreciated that visible indicia can be provided alternatively or in addition to the audible alarm means for visually, as well as audibly, indicating the two temperature limits which have been preset into alarm unit 12. An exemplary circuit component which contains the appropriate circuitry means, and which can be adapted for use in accordance with the precepts of the present invention include Models AP1220 through AP1224 Thermocouple Input Dual Limit Alarms instruments as manufactured by Action Instruments of San Diego, Calif. a description of this circuit component is set forth later herein in conjunction with FIG. 7 of the drawings.

Alarm variations can be implemented readily. For example, the upper temperature setting may be indicated by ever increasing loudness, pitch, frequency, etc. of the emitter as the probe sensed temperature nears the upper setting. In this manner, the alarm may initially sound at 20° C. (or some other convenient value) below the upper temperature setting and then increase in frequency, pitch, etc. as the sensed probe temperature nears the upper temperature setting. Supplemented with a stroboscopic light source, optionally, provides a unique and reliable manner of alerting the brazer.

With reference to FIG. 2, rear plate 22 bears on/off switch 36 and electrical cord 38 which is designed for use with conventional a.c. power. It will be appreciated that alarm unit 12 suitably can be modified to operate on d.c. voltage for true portability. Finally, fuse and fuse holder assembly 40 are disposed for easy access at rear plate 22.

Referring to temperature probe 10 as depicted at FIGS. 1 and 3, probe 10 has been constructed for providing a dual function. One function is the ability to sense temperature by use of a thermocouple wherein the sensed temperature is used via alarm unit 12 for monitoring the temperature of an implement (e.g. polycrystalline diamond mass) being brazed. The second function involves the use of probe 10 to provide tactile, physical force for holding an implement in place for it to be brazed to a workpiece. For example, a composite compact mounted on a carbide stud could be physically pressed and held into position for brazing onto a tool bit utilizing probe 10.

Probe 10 comprises insulating handle 42 having a passageway therethrough which preferably is composed of wood, though ceramic or other insulating material may be appropriate; heat shield 44 which preferably is composed of stainless steel, though ceramic or other material may be appropriate; and stiff support rod 46, which preferably is manufactured from stainless steel for durability and ruggedness, though other materials of construction are feasible. The lower end of handle 42 retains electrical connector or socket depicted at 48 for receiving plug 50 which is disposed at one end of line 14 for providing electrical connection between probe 10 and alarm unit 12. Heat shield 44 is affixed to handle 42 via screws 52a–52c, though other modes of attachment can be envisioned. Rod 46 may be bent in one or more locations for use in hard to access locations.

At the tip of support rod 46 is disposed thermocouple 54. Thermocouple 54 is manufactured to be as small as possible consistent with providing sufficient strength to withstand normal day-to-day usage. The junction of thermocouple 54 being small also maximizes temperature responsiveness of the probe. It should be understood that successful use of probe 10 depends on good thermal contact being established between thermocouple 54 and the implement being brazed (e.g. a polycrystalline diamond mass). Since the brazer likely will hold probe 10 at various angles depending upon the location of the implement being brazed, good thermal contact may be difficult to accomplish. This is especially true since contact may be broken on occasion during the brazing operation. Thus, a unique solution to this problem, as an aspect of the present invention, comprises the use of a glassy material, e.g. a flux, which is viscous enough to form a microbath or pool at the thermocouple/implement interface in order to provide enhanced thermal contact therebetween. Suitable fluxes or thermal contact enhancing agents should be inert with respect to the thermocouple and with respect to the implement in contact therewith. This heat transfer medium additionally should melt at a low temperature, desirably below the minimum braze temperature and should not decompose during the brazing operation even at the upper end of the brazing temperature range. Since implements likely are to be in a sideways or even upside-down condition on occasion, viscosity is important so that the flux agent sufficiently wets the thermal junction surfaces for establishing good thermal contact and does not run or drip off of such surfaces. Suitable flux agents or glassy materials which meet these diverse requirements include, for example, boric oxide, anhydrous boric oxide, mixtures of chlorides and/or fluorides of alkali metals, and the like and mixtures thereof. This use of flux agents for enhancing thermal contact, rather than their use in the conventional cleaning sense, contributes to the practicality and utility of the apparatus of the present invention.

With specific reference to FIG. 3, it will be observed that energizing electrical communication is provided between outlet 48 and thermocouple 54 via two thin electrical wires or lead means which fit within the annular passageways created within probe 10. These electrical wires, identified as 56 and 58 in FIGS. 4 and 5 are sheathed to provide electrical insulation in conventional fashion and even may be sheathed for providing a degree of thermal insulation. Disposed within support rod 46 are ceramic insulating spacers 60 which have a passageway therethrough for accommodating leads 56 and 58 and which passageway is in communication with the passageway in handle 42. Ceramic insulators 60 protect the wires from the extreme temperatures encountered by the probe during conventional brazing operations, while support rod 46 protects the ceramic insulators from damage due to probable rough treatment which the probe may encounter during everyday usage. The ability to utilize probe 10 for retaining an implement in place for its brazing to a workpiece comes from support rod 46 additionally. It will be observed that support rod 46 penetrates into handle 42 a short distance for joining the probe elements together.

Figure 6:
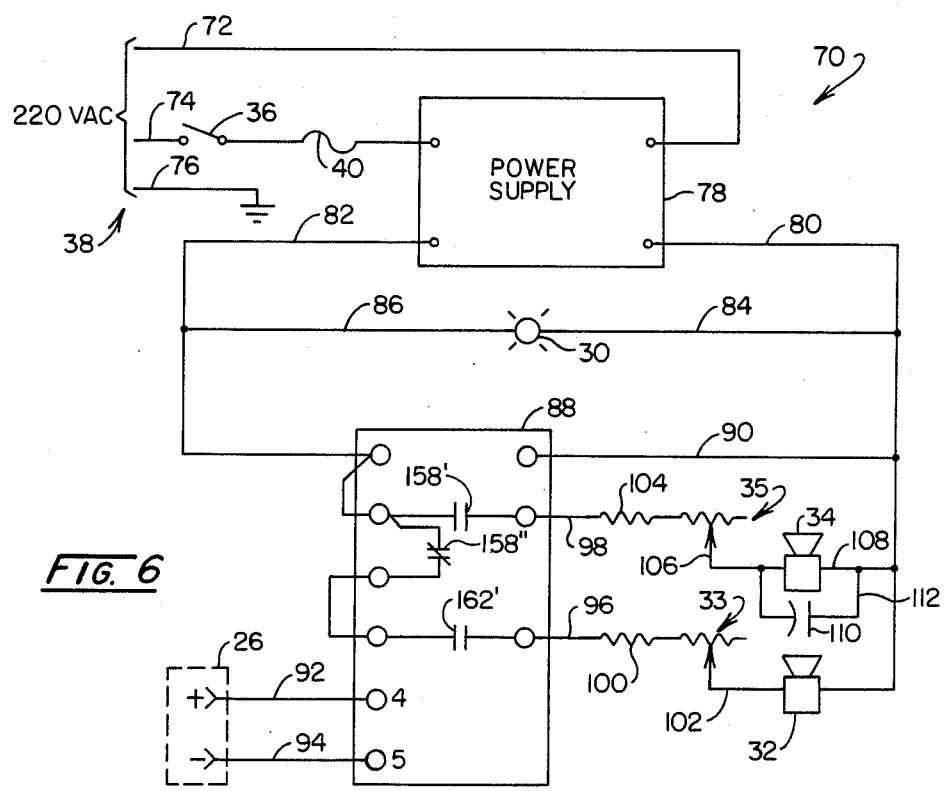
FIG. 6 is an electrical schematic diagram of components within the alarm unit shown in FIG. 1.

Referring to FIG. 6, the circuitry for the apparatus of the invention is represented in general at 70 and is seen to include a conventional input from a line source providing, for example, 220 v a.c. and shown inputted as at FIG. 2 in conjunction with line 38. The positive and negative input components of cable 38 are represented at line inputs 72 and 74 and include a conventional third ground line 76. Line 72 is shown coupled to one input of a conventional a.c./d.c. converter which transforms the conventional line input to a 24 v d.c. output at 1.2 amperes and is represented at block 78. The opposite line input to power supply 78 from line 74 is directed through the earlier-described on/off switch 36 which again is symbolically represented in FIG. 6 by that number. Line 74 further incorporates the earlier-described fuse 40.

The resultant d.c. output from power supply 78 is presented at lines 80 and 82 which initially function to energize the earlier-described light 30 which again is reproduced symbolically in FIG. 6. Coupling of light 30 to lines 80 and 82 is provided from respective lines 84 and 86. Line 82 is shown coupled to one input of the earlier-described Thermocouple Input Dual Limit Alarm Circuit which is represented at block 88. The opposite power input to device 88 is from line 90. Connection with the thermocouple 54 and circuit 88 is provided from the earlier-described jack 26 and is shown entering pins 4 and 5 of the device via respective lines 92 and 94. The outputs of device 88, selectively actuating the annunciators 32 and 34, are provided at respective lines 96 and 98. In this regard, line 96 extends through resistor 100 and adjusting potentiometer, as described earlier at 33 and reproduced herein, to a piezoelectric or like annunciator 32 being addressed from potentiometer 33 by line 102 and coupled to power line 80. In similar fashion, line 98 incorporates resistor 104 and extends through the earlier-described volume controlling potentiometer 35 and line 106 to annunciator 34, the opposite side of which is coupled to supply line 80 from line 108. Because annunciator or piezoelectric device 34 provides a pulsating output, a capacitor 110 is coupled about lines 106 and 108 via line 112.

Figure 7:
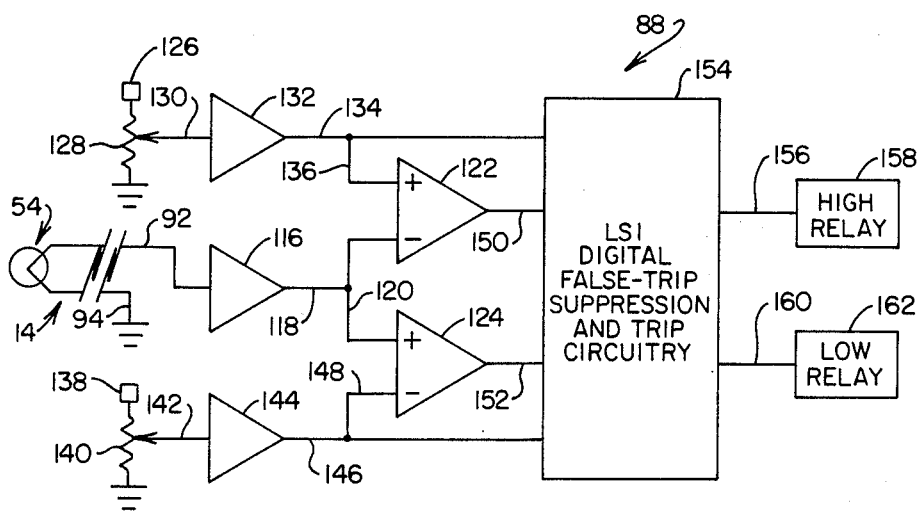
FIG. 7 is a block schematic diagram showing the operation of the thermocouple dual limit alarm component used in conjunction with FIG. 6.

Turning to FIG. 7, a general schematic representation of the device 88 is provided. In the figure, the thermocouple 54 is symbolically represented by the same numeration as being coupled to the device 88 via cable 14 and earlier-described lines 92 and 94. Line 92 extends to the input of an input buffer 116, the output of which at lines 118 and 120 extends to the inverting and non-inverting inputs of respective comparators 122 and 124. The set point for comparator 122 is established by a reference represented at block 126 and an adjustable resistance as represented at 128 in conjunction with wiper arm 130. The latter wiper arm line 130 extends to the input of a buffer 132, the output of which at lines 134 and 136 extends to the non-inverting input of comparator 122. In similar fashion, a reference, as represented at block 138, supplies input to an adjustable resistance 140 incorporating a wiper arm 142 extending, in turn, to buffer 144. The output of buffer 144 at lines 146 and 148 extends to the inverting input of comparator 124. Comparators 122 and 124 provide outputs, respectively, representing high and low trip conditions at lines 150 and 152 which are directed to a Digital False-Trip Suppression and Trip circuitry provided as a large scale integration (LSI) chip and represented at block 154. Lines 134 and 146 additionally function to establish a deadband for each of the trip points of the circuit 88, so as to avoid unwanted oscillation about the threshold levels of each of the comparators 122 and 124. In this regard, a high deadband of 5% as well as a low deadband of 5% is provided. In effect, the deadband is the amount of input change required to reset each limit alarm to an untrip condition.

The output of LSI circuit 154 at line 156 functions to drive an annunciator energizing relay represented at block 158 which, in turn, provides an output at earlier-described line 98 (FIG. 6). Correspondingly, output line 160 functions to drive an annunciator energizing low trip relay represented at block 162 which, in turn, functions to selectively provide drive at earlier-described line 96 (FIG. 6). Low relay 162 is schematically represented in FIG. 6 at block 88 as a normally open set of contacts 162'. In similar fashion, block 88 of FIG. 6 schematically shows high relay 158 as a normally open relay contact 158' performing in conjunction with a normally closed relay contact 158". Thus, when the high trip point is reached and the high relay 158 is activated, low relay 162 is deactivated as represented schematically by the circuit arrangement in block 88.

As noted above, a preferred use for the monitoring apparatus of the present invention involves the brazing of composite compact implements to workpieces as typified by drill bits. The implement is comprised of a polycrystalline composite compact, a stud or substrate, and a thin continuous layer of filler metal disposed therebetween. The composite compact, in turn, is comprised of a polycrystalline particulate mass or layer of bonded abrasive particles and a support or base layer preferably of cemented carbide bonded to the compact. Further details on such implements including their fabrication can be found in U.S. Pat. Nos. 4,225,322; 4,319,707; 4,527,998; and application Ser. No. 752,419. As noted above, thermal damage to polycrystalline diamond can commence occurring at about 700° C. or thereabouts. Thus, the temperature of the polycrystalline diamond mass during the brazing operations should be kept below such temperature unless a heat-sink modification to lessen the polycrystalline diamond mass temperature is employed. Practically speaking, such heat-sink modifications are impractical in daily operation so that the brazing operation of the carbide stud to the drill bit or other workpiece should be conducted so that the temperature of the polycrystalline diamond mass does not exceed the threshold temperature whereat loss of its properties can occur. The monitoring apparatus of the present invention finds its prime use under such circumstances.

As noted above also, the probe is constructed with sufficient reliability and durability so that it can apply tactile force through the composite compact implement for holding the implement in place in the drill bit or other workpiece during the brazing operation. Thus, the brazer need only hold the probe in one hand while holding the welding torch or other heating device in the other hand for accomplishing the brazing operation. Further, the brazer need not continuously look up from the operation in order to visually read the temperature of the workpiece via a dial or other readout device which occasionally is practiced today. The audible alarms provide the temperature monitoring required by the brazer for efficacious attachment of the implement to the drill bit or other workpiece. Such method comprises another aspect of the present invention as will be readily apparent to those skilled in the art. All references cited herein are incorporated expressly herein by reference.

Figure 8:
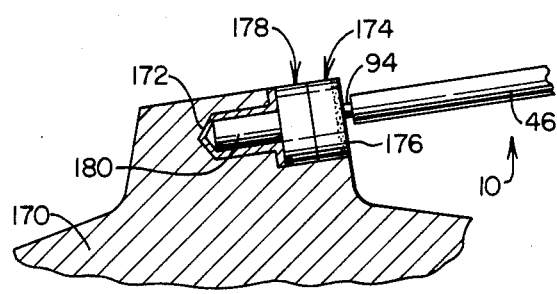
FIG. 8 is a partial sectional view of a workpiece, an implement being brazed thereto and the orientation of apparatus according to the invention with respect thereto.

Referring to FIG. 8, a partial sectional representation of a basic body component of a drill bit shown in the above-referenced U.S. Pat. No. 4,200,159 is revealed in conjunction with the probe of the invention. In this regard, a basic body of a matrix-binder composition is shown at 170. Body 170 is secured in conventional fashion on a connection body (not shown). The body 170 is seen to be formed incorporating a recess 172 into which a cutting member or element 174 is inserted. In the embodiment shown, the cutting element 174 includes a circular disk of sintered metal such as tungsten carbide which is provided on a cutting side with a diamond layer or cover 176 of natural or synthetic diamond or the like. The cutting member 174 is secured to a rigid carrier 178 having a pin 180 extending therefrom for insertion within the recess 172. Member 174 and its associated assemblage is shown being retained in position by the hand asserted pressure applied through temperature probe 10, the stiff support rod 46 being shown in the drawing in conjunction with thermocouple 54. Thus, with the composite component 174 being retained in position by the probe 10, securement may be effected by carrying out a braze operation by which braze flows within the recess 172, while the temperature of the process of securement is monitored from thermocouple 54.

What is claimed is:

1. Apparatus for monitoring the temperature of an implement being brazed to a workpiece, which comprises:
  (a) a temperature probe comprising a stiff support rod of predetermined length extending from a base portion to a tip; thermal insulation means disposed within said support rod substantially along said lengthwise extent and having a first passageway therethrough; an insulating handle connected in supporting relationship with said rod and having a second passageway therethrough communicating with said first passageway; a heat shield disposed about said handle in the vicinity of its connection with said base portion of said rod; thermocouple means energizable for deriving sensing signals of given levels correlative with temperature disposed at said rod tip; and lead means within said first and second passageways electrically coupled with said thermocouple means; and
  (b) an alarm unit including:
    power supply means responsive to an a.c. source for deriving a d.c. supply output;
    annunciator means energizable by a first drive signal to provide a first audibly perceptible output indicating that brazing can begin and energizable by a second drive signal to provide a second audibly perceptible output indicating that a brazing upper threshold temperature has been reached; and
    circuit means energizable from said d.c. supply output, coupled with said annunciator means and connectable with said lead means for effecting the energization of said thermocouple means, and responsive to said sensing signals reaching a first predetermined level of said given levels corresponding with a braze enablement temperature value to generate said first drive signal, and further responsive to said sensing signals reaching a second predetermined level of said given levels corresponding with said brazing upper threshold temperature to generate said second drive signal.

2. The apparatus of claim 1 wherein said stiff support rod comprises stainless steel.

3. The apparatus of claim 1 wherein said insulation means comprises ceramic insulation.

4. The apparatus of claim 1 wherein said handle comprises wood.

5. The apparatus of claim 4 wherein said support rod comprises stainless steel and said insulation means comprises ceramic insulation.

6. The apparatus of claim 1 in which:
said first drive signal is continuous and effects a continuous tone at said annunciator means; and
said second drive signal effects said audibly perceptible output as a pulsating tone audibly distinguishable from said continuous tone.

7. The apparatus of claim 1 in which said circuit means is responsive to an open circuit condition of said lead means to generate said second drive signal.

8. The apparatus of claim 1 in which said alarm circuit includes visual cueing means energizable from said d.c. supply output.

9. Method for monitoring the temperature of an implement comprising a composite compact having an abrasive particle layer bonded to a support, which implement is being brazed to a substrate by a brazing filler metal disposed therebetween, which comprises:
  (a) contacting a thermocouple of a temperature probe with said abrasive particle layer while applying heat for liquefying said brazing filler metal, said temperature probe comprising a stiff support rod of predetermined length with extent extending from a base portion to a tip; thermal insulation means disposed within said support rod substantially along said lengthwise extent and having a first passageway therethrough; an insulating handle connected in supporting relationship with said rod and having a second passsageway therethrough communicating with said first passageway; a heat shield disposed about said handle in the vicinity of its connection with said base portion of said rod; thermocouple means energizable for deriving sensing signals of given levels correlative with temperature disposed at said rod tip; and lead means within said first and second passageways electrically coupled connector with said thermocouple means;
  (b) providing an alarm unit including power supply means responsive to an a.c. source for deriving a d.c. supply output; annunciator means energizable by a first drive signal to provide a first audibly perceptible output indicating that brazing can begin and energizable by a second drive signal to provide a second audibly perceptible output indicating that a brazing upper threshold temperature has been reached; circiut means energizable from said d.c. supply output, coupled with said annunciator means and with said lead means for effecting the energization of said thermocouple means, and responsive to said sensing signals reaching a first predetermined level of said given levels corresponding with a braze enablement temperature value to generate said first drive signal, and further responsive to said sensing signals reaching a second predetermined level of said given levels corresponding with a said brazing upper threshold temperature level to generate said second drive signal;
  (c) monitoring said alarm unit while applying said heat so that brazing proceeds during said generation of said first drive signal and first audibly perceptible output, provided that said heating is discontinued upon the generation of said second drive signal and second audibly perceptible output which is indicative of a threshold temperature maximum tolerated by said abrasive particle layer; and
  (d) discontinuing said heating upon the completion of said brazing.

10. The method of claim 9 wherein said support and said substrate are cemented carbides.

11. The method of claim 10 wherein both said support and said substrate are metal bonded carbide selected from the group consisting of tungsten carbide, titanium carbide, tungsten molybdenum carbide, and tantalum carbide, wherein the metal providing the metal bond is selected from the group consisting of cobalt, nickel, iron, and mixtures thereof.

12. The method of claim 11 wherein both said support and said substrate are cobalt-cemented tungsten carbide.

13. The method of claim 9 wherein said abrasive particle layer comprises a self-bonded polycrystalline diamond compact having an infiltrated metal second phase.

14. The method of claim 13 wherein said second phase comprises cobalt.

15. The method of claim 9 wherein said first drive signal corresponds to a temperature sensed by said thermocouple means which is adequate for said brazing filler metal to braze said implement to said substrate.

16. The method of claim 9 wherein said support rod comprises stainless steel, said insulation means comprises ceramic insulation, and said handle comprises wood.

17. The method of claim 9 wherein said first drive signal derives a continuous audible tone from said annunciator means.

18. The method of claim 9 wherein said second drive signal derives an audible interrupted tone from said annunciator means.

19. The method of claim 9 wherein a flux is used as a heat transfer medium between said thermocouple and said abrasive particle layer.

20. The method of claim 19 wherein said flux is selected from the group consisting of boric oxide, anhydrous boric oxide, chlorides of alkali metals, fluorides of alkali metals, and mixtures thereof.

21. The method of claim 20 wherein said flux comprises boric oxide.

* * * * *